United States Patent
Baba et al.

(10) Patent No.: US 8,384,235 B2
(45) Date of Patent: Feb. 26, 2013

(54) WIND TURBINE GENERATOR

(75) Inventors: Mitsuya Baba, Tokyo (JP); Yasutaka Nishimoto, Tokyo (JP); Kei Kumamoto, Nagasaki (JP); Soshi Maruta, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/104,228

(22) Filed: May 10, 2011

(65) Prior Publication Data

US 2012/0061971 A1     Mar. 15, 2012

Related U.S. Application Data

(63) Continuation-in-part of application No. 13/093,964, filed on Apr. 26, 2011.

(51) Int. Cl.
*H02J 1/00*     (2006.01)

(52) U.S. Cl. .......................................................... 307/1

(58) Field of Classification Search ........................ 307/1
See application file for complete search history.

(56) References Cited

U.S. PATENT DOCUMENTS

| 2,142,874 | A * | 1/1939 | Sadowsky ...................... 455/402 |
| 4,723,115 | A * | 2/1988 | Apter ............................. 333/181 |
| 2004/0142599 | A1 * | 7/2004 | Cope et al. .................... 439/620 |
| 2006/0156802 | A1 * | 7/2006 | Cohen ............................. 73/146 |

\* cited by examiner

*Primary Examiner* — Robert L. Deberadinis

(74) *Attorney, Agent, or Firm* — Kanesaka Berner & Partners LLP

(57) ABSTRACT

An object of the present invention is to provide a wind turbine generator in which a communication channel can be added in communication between a hub and a nacelle, without making a modification to the design of a slip ring. The present invention provides a wind turbine generator in which communication between the hub and the nacelle is performed by superimposing an information signal onto AC power carried over an AC power line between the hub and the nacelle via the slip ring.

8 Claims, 8 Drawing Sheets

WIND TURBINE GENERATOR

BACKGROUND OF THE INVENTION

1. Field of the Invention

The present invention relates to a wind turbine generator, and in particular to communication performed in a wind turbine generator between a hub and a nacelle, between a nacelle and a tower bottom, and the like.

2. Description of Related Art

Conventionally, in the case where communication is performed in a wind turbine generator between a controller or a measuring apparatus housed in a hub (rotor head) and a device housed in a nacelle, communication channels are provided in a slip ring, and wired data communication is performed, as shown in FIG. 8.

Also, during site installation of a wind turbine generator, maintenance and inspection, and the like, communication needs to be performed between workers in the hub and workers in the nacelle, and between workers in the nacelle and workers at the tower bottom. In such cases as well, similarly to the above-described communication between devices, a telephone line (audio communication channel) is provided in the slip ring, and wired communication is performed.

However, there is a restriction on the number of channels that can be provided in the slip ring. For this reason, there has been a proposal for performing data communication using wireless communication technology when there is a desire to further add a communication channel, for example. Also, in order to realize audio communication between workers, the use of mobile phones, transceivers, and the like has been proposed.

BRIEF SUMMARY OF THE INVENTION

However, the hub rotates, and therefore when wireless communication technology is used, depending on the location where the transmission and reception antennas are attached, there are problems such as communication becoming unstable due to the rotation, and the communication path being blocked by the blades.

An object of the present invention is to provide a wind turbine generator in which a communication channel can be added in communication between the hub and the nacelle, without making a modification to the design of the slip ring.

The present invention provides a wind turbine generator in which communication can be performed between a hub and a nacelle, the wind turbine generator including: a first power line that carries electrical power between the hub and the nacelle via a slip ring; a hub-side signal processing unit, provided on a hub side of the slip ring, that superimposes an information signal onto the electrical power carried by the first power line and extracts an information signal superimposed onto the electrical power carried by the first power line; and a nacelle-side signal processing unit, provided on a nacelle side of the slip ring, that superimposes an information signal onto the electrical power carried by the first power line and extracts an information signal superimposed onto the electrical power carried by the first power line.

According to the present invention, the hub-side signal processing unit is provided on the hub side of the slip ring, the nacelle-side signal processing unit is provided on the nacelle side of the slip ring, and the hub-side signal processing unit and the nacelle-side signal processing unit superimpose an information signal on electrical power carried between the hub and the nacelle via the slip ring. This eliminates the need for the slip ring to be provided with a signal line, and therefore even if an increase in the number of channels is required, it is possible to easily increase the number of channels without making a modification to the design of the slip ring.

In the wind turbine generator, there may be a plurality of first power lines, including an AC power line that carries AC electrical power and a DC power line that carries DC electrical power, and the power line onto which an information signal is superimposed may be switched according to a condition of power transmission on each of the power lines.

In this way, if there are two or more first power lines, the power line onto which the information signal is superimposed is selected according to the condition of power transmission, thus enabling a reduction in the occurrence of, for example, transmission errors due to the influence of noise.

In the wind turbine generator, there may be a plurality of first power lines, including an AC power line that carries AC electrical power, and a DC power line that carries DC electrical power, and the power line onto which an information signal is superimposed may be switched according to an information amount or a type of the information signal.

Switching the power line according to the information amount or the type of signal to be superimposed enables selecting an appropriate power line according to the information that is to be transmitted, thus making it possible to more reliably transmit and receive information.

For example, a configuration is possible in which communication is performed using an AC power line in the case of a wind turbine control signal, and communication is performed using a DC power line in the case of a monitoring or measurement system signal. Examples of a wind turbine control signal include control signals exchanged between the hub controller and the nacelle controller, and blade strain data from an optical fiber sensor or the like. Also, examples of a monitoring or measurement system signal include a signal obtained by a measuring apparatus for, for example, measuring the temperature inside the hub.

In the wind turbine generator, there may be a plurality of first power lines, including an AC power line that carries AC electrical power and a DC power line that carries DC electrical power, and an information signal may be superimposed one of the AC power line and the DC power line, and the other may be used for backup.

In this way, by using the other one of the power lines for backup, even if communication via the one power line fails, information can be extracted from the other power line used for backup. This enables information to be reliably transmitted and received.

In the wind turbine generator, the first power line between the hub-side signal processing unit and the nacelle-side signal processing unit may be provided with shielding.

In this way, performing shielding enables preventing electromagnetic waves from leaking to the outside (e.g., to the wind turbine controller or measuring apparatus), thus enabling mitigating the influence exerted on external devices. It is also possible to mitigate the influence exerted on power line communication by operation noise from an external device (e.g., switching noise from a relay or the like).

In the wind turbine generator, the hub-side signal processing unit may superimpose an information signal received as input from a hub controller via a communication line onto the electrical power carried by the first power line, extract an information signal from the electrical power carried by the first power line, and output the extracted information signal to the hub controller via the communication line, and the nacelle-side signal processing unit may superimpose an information signal received as input from a nacelle controller via a communication line onto the electrical power carried by the first power line, extract an information signal from the electrical power carried by the first power line, and output the extracted information signal to the nacelle controller via the communication line.

According to such a configuration, a communication channel can be added in communication between the hub controller and the nacelle controller without making a modification to the design of the slip ring.

In the wind turbine generator, a microphone and a speaker may be connected to the hub-side signal processing unit and the nacelle-side signal processing unit, and the hub-side signal processing unit and the nacelle-side signal processing unit may superimpose an information signal received as input from the microphone onto the electrical power carried by the first power line, extract an information signal superimposed onto the electrical power carried by the first power line, and output the extracted information signal to the speaker.

According to such a configuration, audio signals received as input from the microphone is sent from the nacelle side to the hub side and from the hub side to the nacelle side, using electrical power carried by the first power line as the communication medium, and thereafter the audio signals are output from the speaker. This enables adding a communication channel in communication between a worker in the hub and a worker in the nacelle without making a modification to the design of the slip ring. Furthermore, using electrical power as the communication medium can resolve deficiencies such as sound interruptions, thus enabling an improvement in the communication environment.

The wind turbine generator may include: a second power line that carries electrical power between the nacelle and a tower bottom; and a tower-side signal processing unit that is provided in the tower and is connected to a microphone and a speaker, wherein the nacelle-side signal processing unit may have a switching unit that switches between the hub-side signal processing unit and the tower-side signal processing unit that are communication partners, and in a case where the tower-side signal processing unit has been set as the communication partner by the switching unit, the nacelle-side signal processing unit and the tower-side signal processing unit may superimpose an information signal received as input from the microphone onto the electrical power carried by the second power line, extract an information signal superimposed onto the electrical power carried by the second power line, and output the extracted information signal to the speaker.

According to such a configuration, it is possible to resolve deficiencies such as sound interruptions in audio communication between the nacelle and the tower bottom, in addition to audio communication between the hub and the nacelle, thus enabling an improvement in the communication environment.

DETAILED DESCRIPTION OF THE INVENTION

Figure 1:
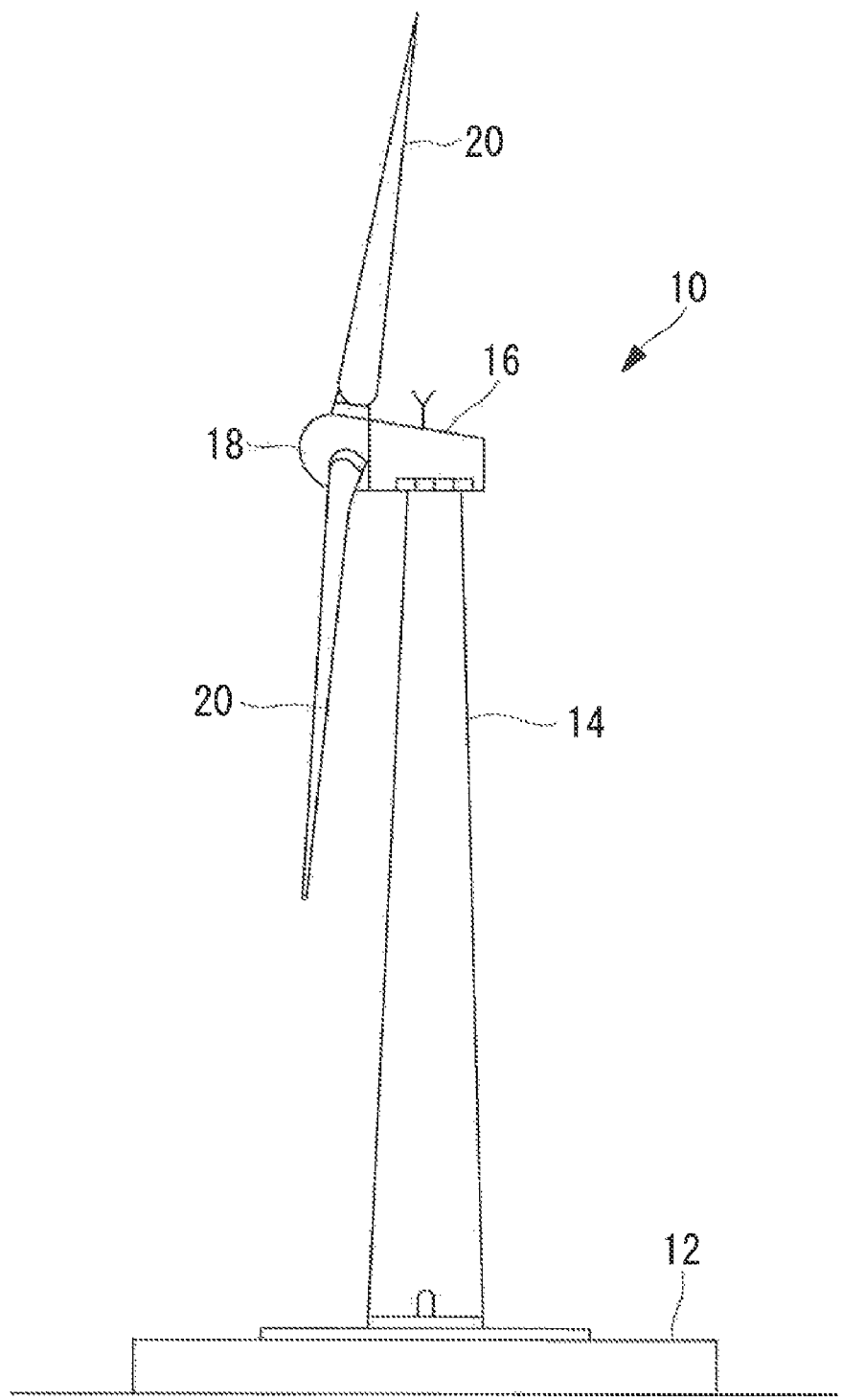
FIG. 1 is an external view of a wind turbine generator according to a first embodiment of the present invention.

Below is a description of a wind turbine generator according to a first embodiment of the present invention with reference to the drawings. FIG. 1 is an external view of a wind turbine generator 10 according to the first embodiment of the present invention. The wind turbine generator 10 shown in FIG. 1 is a so-called variable-speed wind turbine and has a support column 14 provided upright on a foundation 12, a nacelle 16 disposed on the upper end of the support column 14, and a hub (rotor head) 18 provided on the nacelle 16 so as to be able to rotate about a substantially horizontal axis.

A plurality of blades (e.g., three in the present embodiment) 20 are attached to the hub 18 in a radial configuration around the rotation axis of the hub 18. The blades 20 are joined to the hub 18 so as to be able to rotate in accordance with an operating condition, and the pitch angle of the blades 20 is variable.

Figure 2:
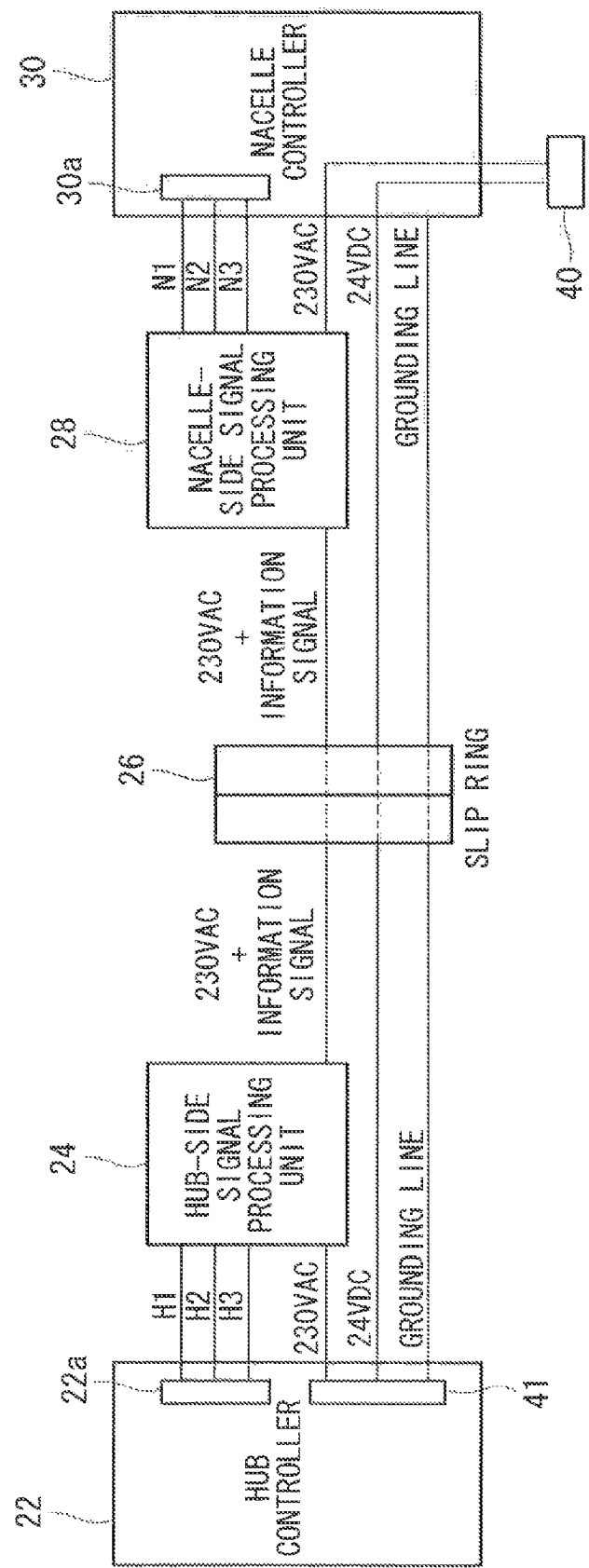
FIG. 2 is a diagram showing a main configuration related to communication between a hub and a nacelle in the wind turbine generator according to the first embodiment of the present invention.

FIG. 2 is a block diagram showing a main configuration related to communication between the hub and the nacelle according to the present embodiment. In FIG. 2, first power lines and a grounding line for carrying electricity via a slip ring 26 are provided between a hub controller 22 housed inside the hub 18 and a nacelle controller 30 housed inside the nacelle 16. In the present embodiment, an AC power line 230 VAC that supplies 230-V AC power from the nacelle side to the hub side and a DC power line 24 VDC that supplies 24-V DC power from the nacelle side to the hub side are provided as the first power lines. Specifically, 230-V AC voltage and 24-V DC voltage supplied by a power supply 40 provided on the nacelle side are supplied to a power input unit 41 on the hub side via the respective power lines.

A hub-side signal processing unit 24 is provided on the hub side of the slip ring 26. The hub-side signal processing unit 24 is connected to a communication processing unit 22a of the hub controller 22 by three signal lines H1, H2, and H3. The hub-side signal processing unit 24 superimposes information signals received as input via the three signal lines H1, H2, and H3 onto the AC power carried by the AC power line 230 VAC. The hub-side signal processing unit 24 also extracts an information signal superimposed onto AC power carried by the AC power line 230 VAC, and outputs the extracted information signal to the communication processing unit 22a of the hub controller 22 via the signal line H1, H2, or H3.

A nacelle-side signal processing unit 28 is provided on the nacelle side of the slip ring 26. The nacelle-side signal processing unit 28 is connected to a communication processing unit 30a of the nacelle controller 30 by three signal lines N1, N2, and N3. The nacelle-side signal processing unit 28 superimposes information signals received as input via the three signal lines N1, N2, and N3 onto the AC power carried by the AC power line 230 VAC. The nacelle-side signal processing unit 28 also extracts an information signal superimposed onto AC power carried by the AC power line 230 VAC, and outputs the extracted information signal to the communication processing unit 30a of the nacelle controller 30 via the signal line N1, N2, or N3.

The signal line N1 on the nacelle side corresponds to the signal line H1 on the hub side, the signal line N2 on the nacelle side corresponds to the signal line H2 on the hub side, and the signal line N3 on the nacelle side corresponds to the signal line H3 on the hub side. The signal lines N1 and H1 constitute the same channel, and the same follows for the signal lines N2 and H2 as well as the signal lines N3 and H3. Bidirectional communication between the nacelle and the hub is realized by each of the channels.

Also, the DC power line 24 VDC and the AC power line 230 VAC between the hub-side signal processing unit 24 and the nacelle-side signal processing unit 28 are shielded. This enables mitigating the influence exerted on external devices due to the leakage of electric radiation to the outside, and enables mitigating the influence of noise from the outside.

Figure 3:
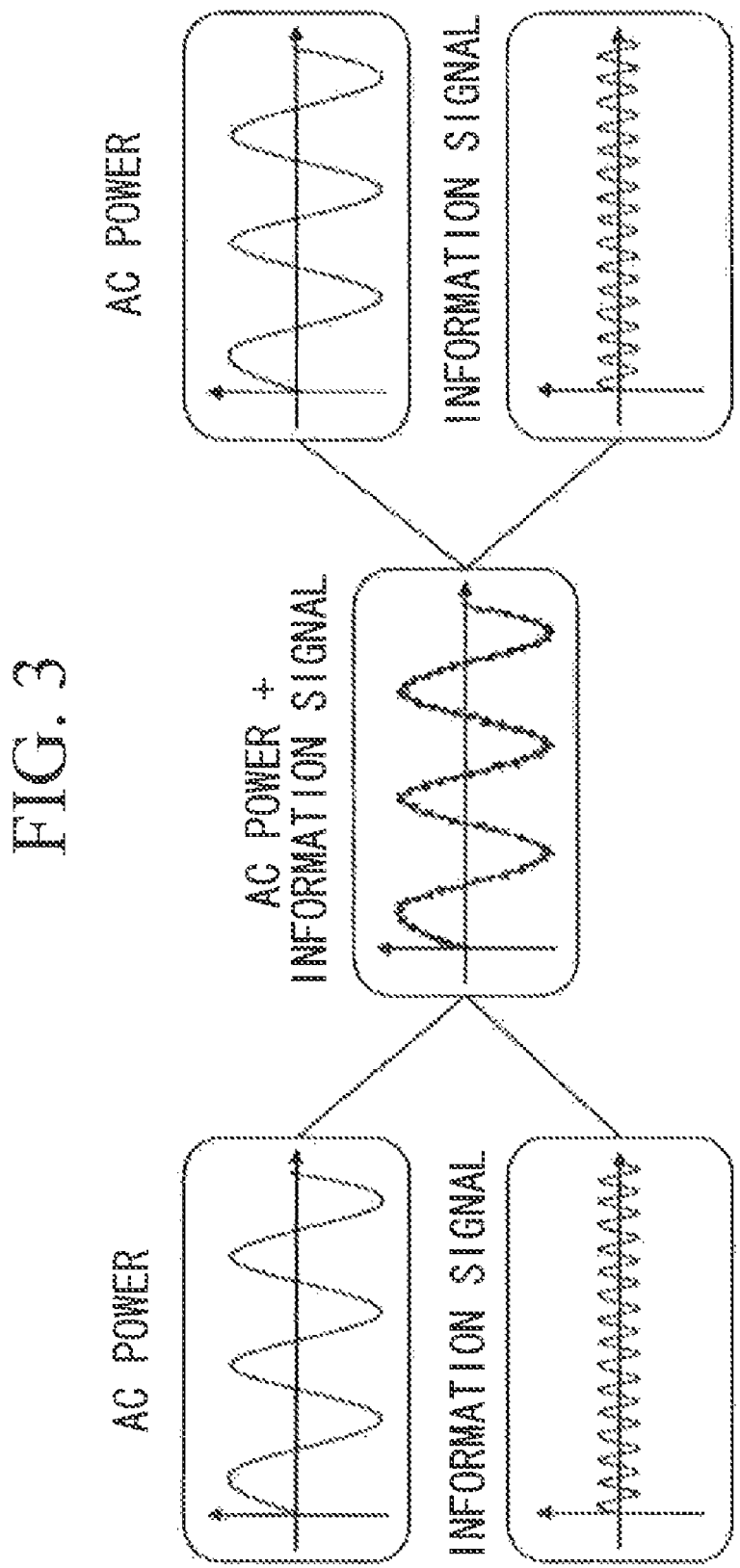
FIG. 3 is a diagram conceptually showing the case of superimposing an information signal onto AC power and the case of extracting an information signal that has been superimposed onto AC power.

In the wind turbine generator 10 having such a configuration, communication is performed, for example, as described below. For example, if the nacelle controller 30 has generated a pitch angle command signal for controlling the pitch angle of the blades, the pitch angle command signal is output to the nacelle-side signal processing unit 28 via the signal line N1, N2, or N3. Upon receiving the pitch angle command signal, the nacelle-side signal processing unit 28 superimposes the signal onto the AC power carried by the AC power line 230 VAC (see FIG. 3).

The AC power onto which the pitch angle command signal was superimposed is sent to the hub-side signal processing unit 24 over the AC power line 230 VAC via the slip ring 26. The hub-side signal processing unit 24 extracts the pitch angle command signal superimposed onto the AC power carried via the AC power line 230 VAC (see FIG. 3) and outputs the extracted pitch angle command signal to the communication processing unit 22a of the hub controller 22 via the signal line H1, H2, or H3. Accordingly, the hub controller 22 controls a hydraulic actuator (not shown) based on the pitch angle command signal, and thus the pitch angle of the blades 20 (see FIG. 1) is changed.

Also, on the hub side, if information to be transmitted to the nacelle side (e.g., error notification information) has been generated, the hub-side signal processing unit 24 superimposes such information onto the AC power carried by the AC power line 230 VAC. The AC power onto which the information was superimposed is sent to the nacelle-side signal processing unit 28 over the AC power line 230 VAC via the slip ring 26, and thereafter the information signal superimposed onto the AC power is extracted. The extracted information signal is output to the communication processing unit 30a of the nacelle controller 30 via the signal line N1, N2, or N3.

As described above, according to the wind turbine generator 10 of the present embodiment, data communication between the hub controller 22 disposed in the hub and the nacelle controller 30 disposed in the nacelle is performed using Power Line Communication for superimposing information onto electrical power, and therefore even if an increase in the number of communication channels is required, it is possible to easily increase the number of communication channels without making a modification to the design of the slip ring 26.

For example, even in the case where a condition monitoring device, camera, microphone, and the like are additionally provided in the hub of an existing wind turbine generator, thus requiring the transmission of various types of information acquired by these devices to the nacelle side, it is possible to achieve the effect of enabling the construction of a highly reliable communication path without making a significant modification to the existing wind turbine generator. Furthermore, in the case of application to a newly-provided wind turbine generator, it is possible to eliminate or minimize the need for communication channels in the slip ring 26, thus enabling a reduction in cost.

Figure 4:
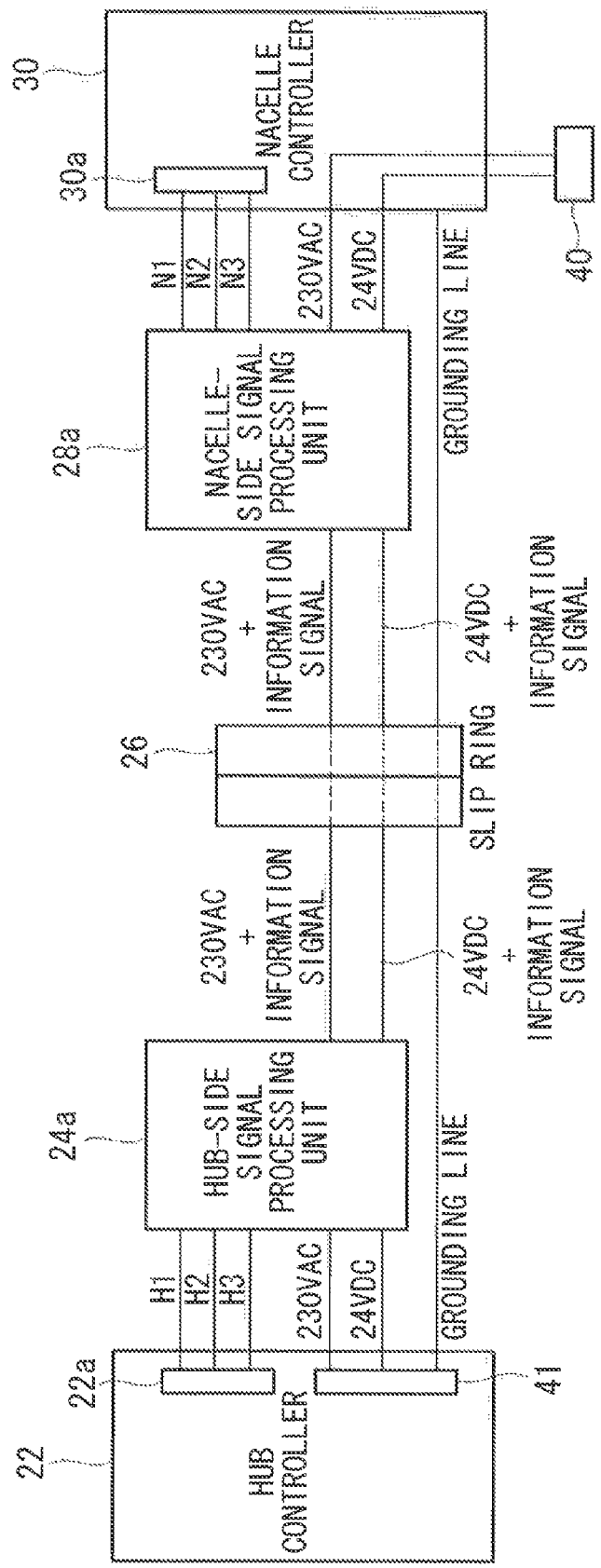
FIG. 4 is a diagram illustrating the case where communication is performed using both an AC power line and a DC power line in the configuration shown in FIG. 2.

Note that although the case of superimposing an information signal onto the AC power carried via the AC power line 230 VAC is described in the present embodiment, instead of this or in addition to this, an information signal may be superimposed onto the DC power carried via the DC power line 24 VDC. FIG. 4 shows a configuration in the case where communication is performed using both the AC power line 230 VAC and the DC power line 24 VDC.

As shown in FIG. 4, in the case of performing communication using both the AC power line 230 VAC and the DC power line 24 VDC, the power line onto which information is superimposed may be switched according to, for example, the condition of power transmission. For example, power line switching is performed if an error has occurred due to the influence of noise. Also, the power line that is used may be switched according to the information amount or the type of the signal to be superimposed. In this case, a configuration is possible in which, for example, communication is performed using the AC power line 230 VAC in the case of a control signal, and communication is performed using the DC power line 24 VDC in the case of a monitoring signal. Furthermore, a configuration is possible in which information signals are superimposed on either the AC power line 230 VAC or the DC power line 24 VDC, and the other is used for backup.

Next is a description of a wind turbine generator according to a second embodiment of the present invention. Although the case of data communication between the nacelle controller 30 and the hub controller 22, that is to say, data communication between devices is envisioned in the wind turbine generator of the first embodiment described above, the case of audio communication between a worker in the hub and a worker in the nacelle is envisioned in the wind turbine generator of the present embodiment. Descriptions of points in common with the first embodiment have been omitted, and the following describes mainly differing points.

Figure 5:
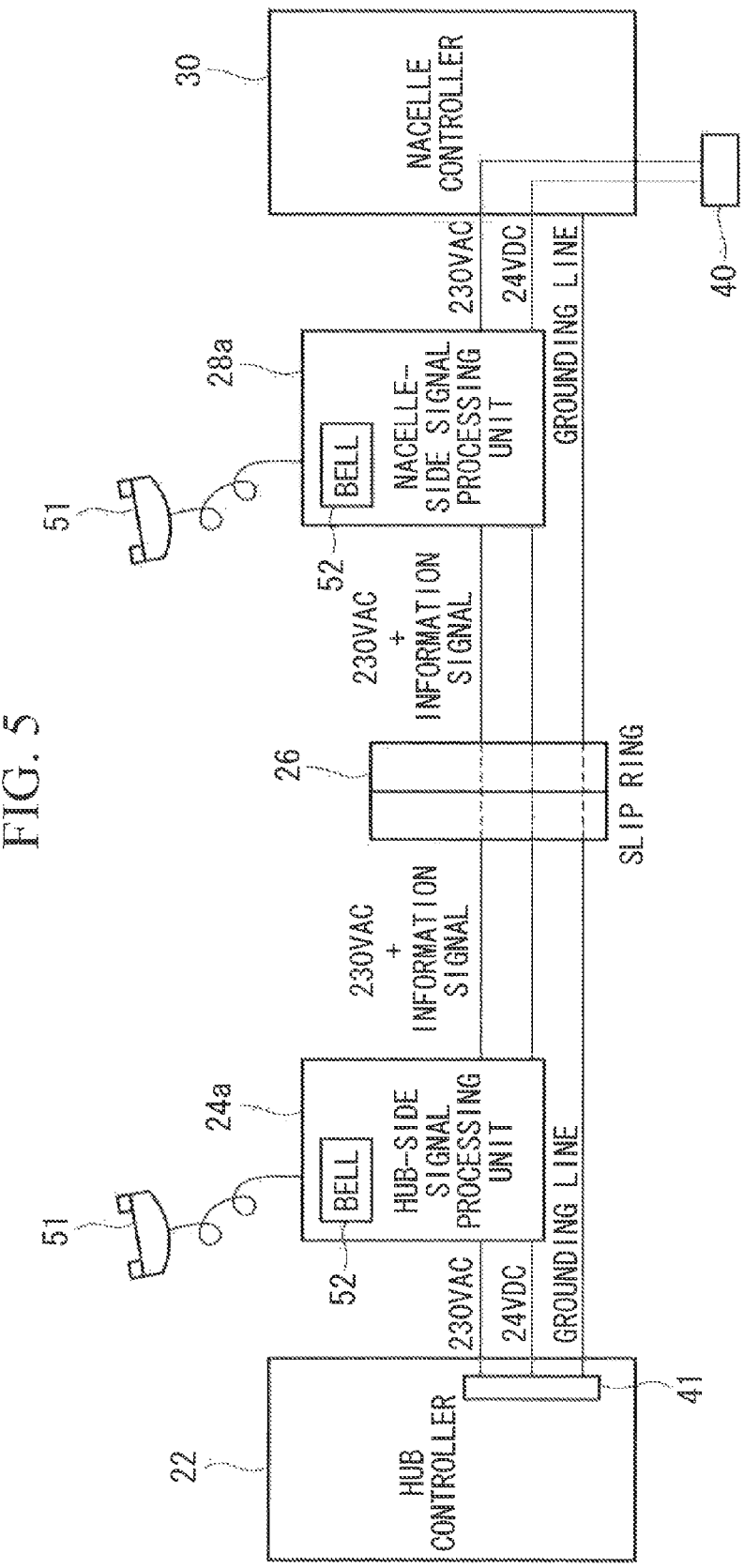
FIG. 5 is a diagram showing a main configuration related to communication between a hub and a nacelle in a wind turbine generator according to a second embodiment of the present invention.
Figure 6:
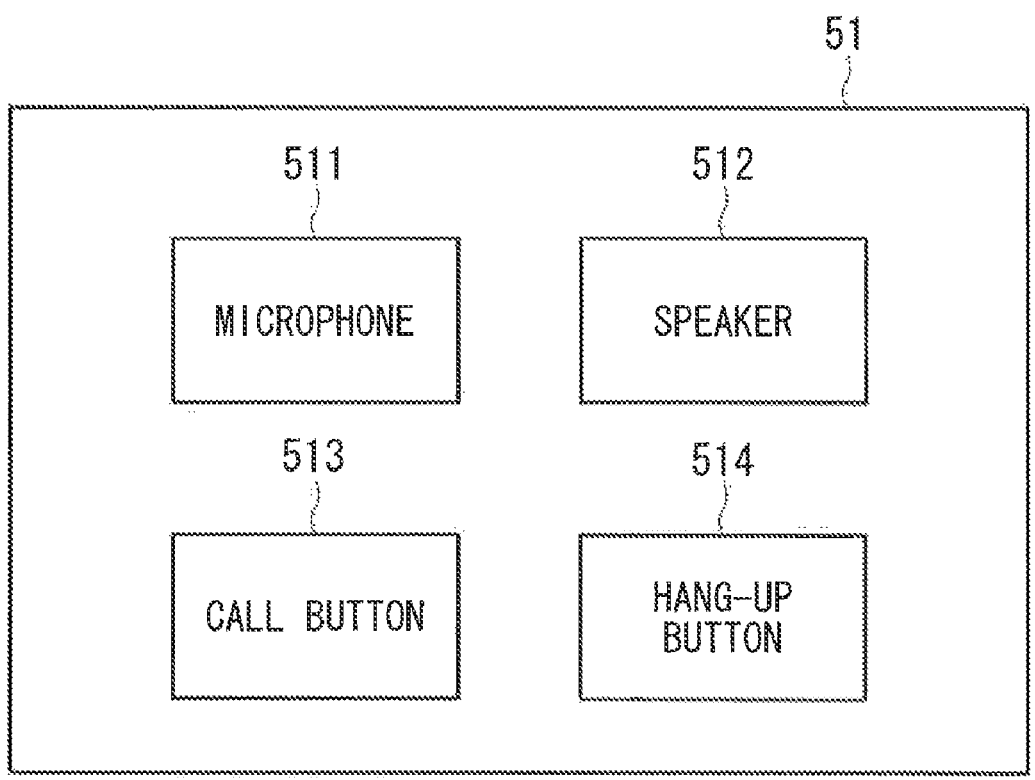
FIG. 6 is a diagram showing a schematic configuration of a receiver shown in FIG. 5.

FIG. 5 is a diagram showing a main configuration related to audio communication between the hub and the nacelle in the wind turbine generator according to the second embodiment of the present invention. In FIG. 5, the same reference signs have been given to constituent elements that are similar to those in FIG. 4. As shown in FIG. 5, in the wind turbine generator of the present embodiment, receivers 51 and bells 52 are connected to a hub-side signal processing unit 24a and a nacelle-side signal processing unit 28a. As shown in FIG. 6, each of the receivers 51 includes a microphone 511, a speaker 512, a call button 513, and a hang-up button 514.

If a worker working in the nacelle desires to communicate with a worker working in the hub, the worker first operates the call button 513 of the receiver 51 connected to the nacelle-side signal processing unit 28a. Upon detecting the operation of the call button 513, the nacelle-side signal processing unit 28a superimposes an information signal indicating the start of calling onto the AC power carried by the AC power line 230 VAC.

The AC power onto which such information was superimposed is sent to the hub-side signal processing unit 24a via the slip ring 26, and the information signal superimposed onto the AC power is extracted. If the extracted information signal is an information signal indicating the start of calling, the hub-side signal processing unit 24a alerts the worker in the hub regarding the call request by causing the bell 52 to operate.

Upon receiving this alert, the worker in the hub operates the call button 54 with which the hub-side signal processing unit 24a is provided, and thereafter audio communication using AC power as the communication medium is established, thus enabling calling between the nacelle and the hub. In the calling, the nacelle-side signal processing unit 28a and the hub-side signal processing unit 24a superimpose an audio signal received as input from the microphone 511 onto AC power, and extract an information signal superimposed onto AC power and output the extracted information signal to the speaker 512.

Then, if an instruction to end calling has been input by either of the workers operating the hang-up button 514, a signal processing unit connected to the hang-up button 514 that was operated disconnects the audio communication that had been established, and thus communication ends.

As described above, according to the wind turbine generator of the present embodiment, audio communication between the hub and the nacelle is performed using Power Line Communication for superimposing information onto electrical power, and therefore even if an increase in the number of communication channels is required, it is possible to easily increase the number of communication channels without making a modification to the design of the slip ring 26. Also, using electrical power as the communication medium enables reducing the influence of external noise compared with the case of performing audio communication using wireless communication technology, thus enabling improving the calling environment.

Note that although the case of performing audio communication using AC power carried by the AC power line 230 VAC as the medium has been described in the present embodiment, alternatively a configuration is possible in which audio communication is performed using DC power carried by the DC power line 24 VDC as the medium. Also, a configuration is possible in which the power line that is used is changed between the case where an information signal is transmitted from the hub-side signal processing unit 24a to the nacelle-side signal processing unit 28a, and the case where an information signal is transmitted from the nacelle-side signal processing unit 28a to the hub-side signal processing unit 24a.

Also, the hub-side signal processing unit 24a and the nacelle-side signal processing unit 28a may be provided with a shield for preventing the leakage of electromagnetic waves. Furthermore, the hub-side signal processing unit 24a and the nacelle-side signal processing unit 28a may be provided with a surge arrester in order to be prepared for a lightning strike.

Figure 7:
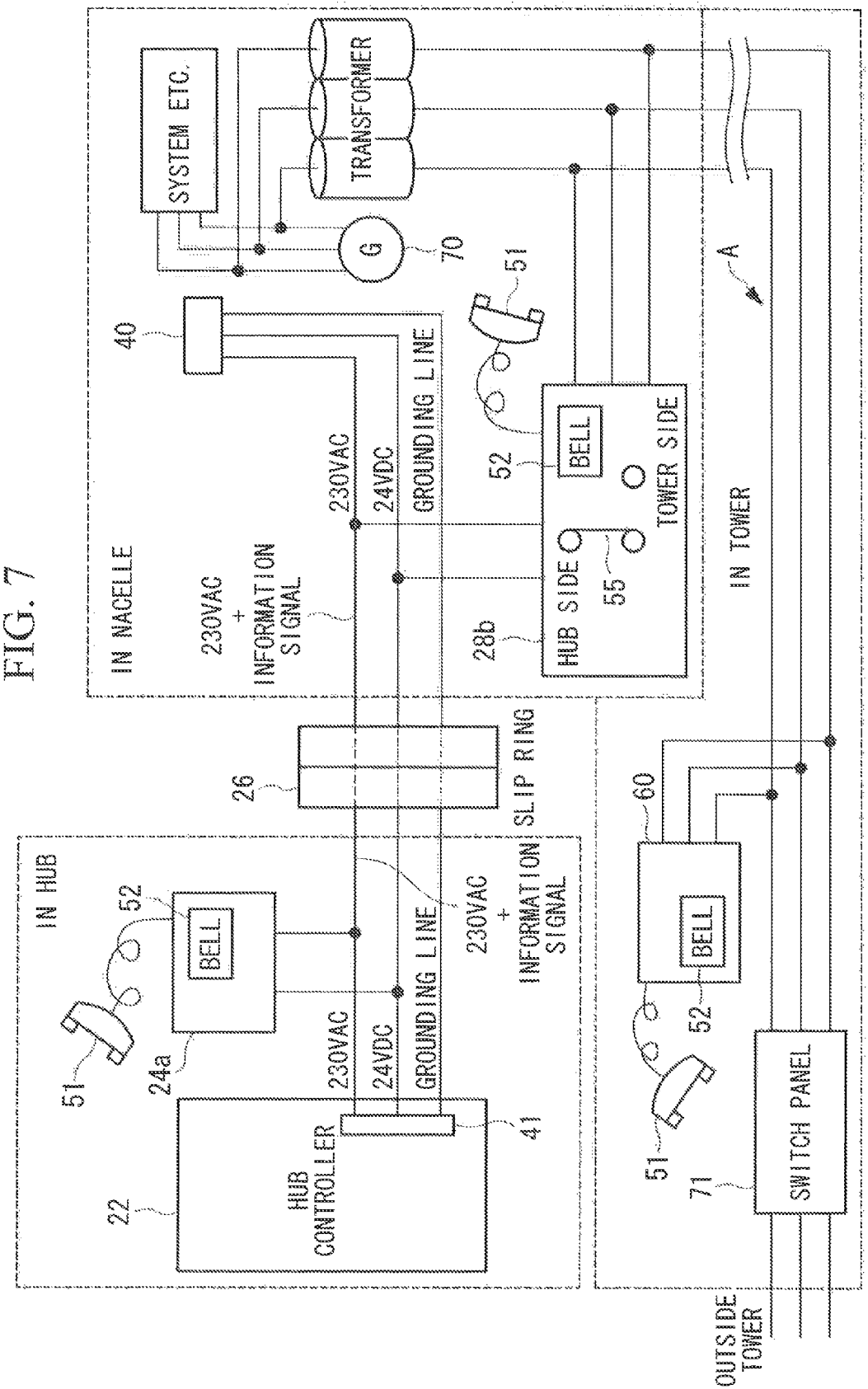
FIG. 7 is a diagram showing a main configuration related to communication between a hub and a nacelle and between the nacelle and a tower bottom in a wind turbine generator according a third embodiment of the present invention.
Figure 8:
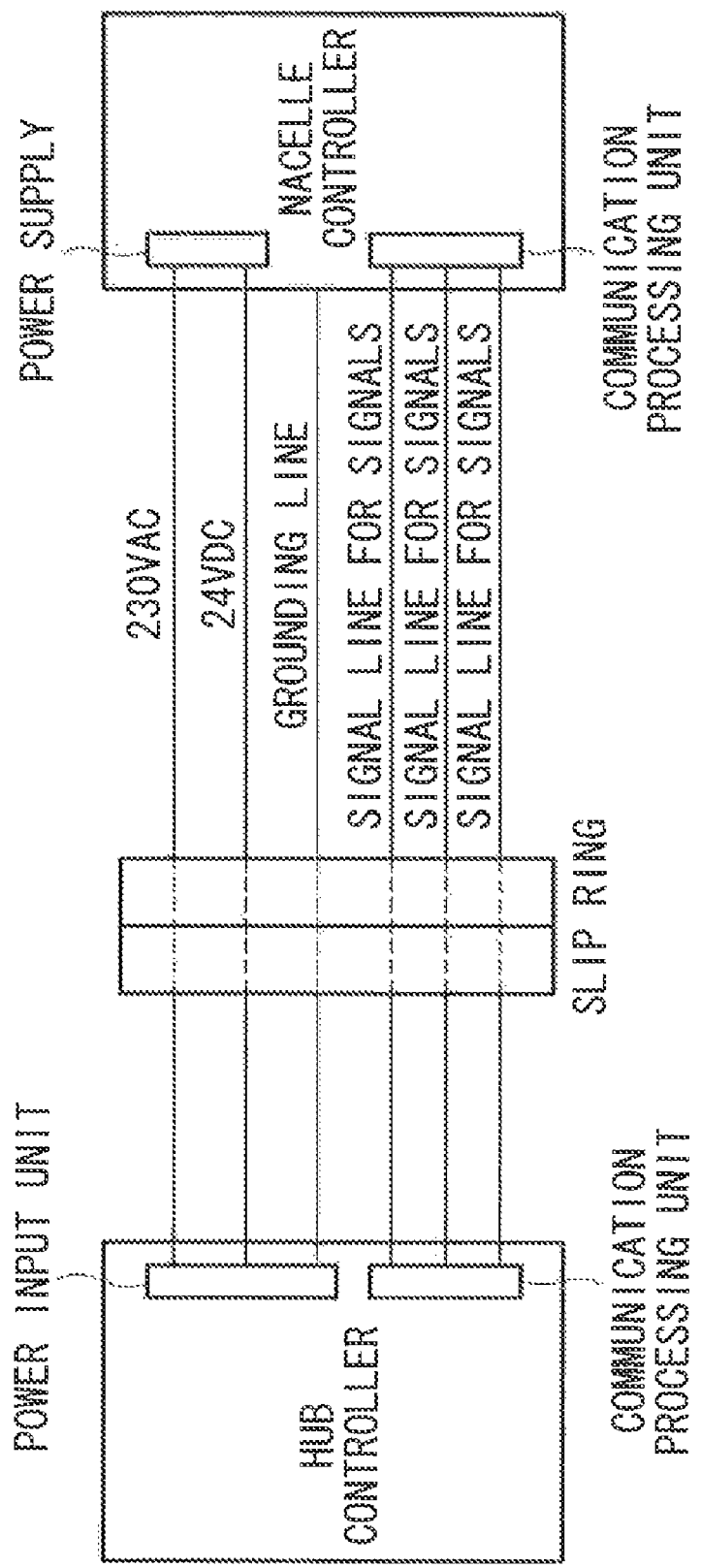
FIG. 8 is a diagram illustrating communication between a hub and a nacelle in a conventional wind turbine generator.

Next is a description of a wind turbine generator according to a third embodiment of the present invention with reference to FIG. 7. Although the case of audio communication performed between the nacelle interior and the hub interior is described in the second embodiment, the wind turbine generator of the present embodiment is configured so as to furthermore realize audio communication between the nacelle interior and the tower bottom. Descriptions of points in common with the second embodiment have been omitted, and the following describes mainly differing points.

FIG. 7 is a diagram showing a main configuration related to communication between the hub and the nacelle and between the nacelle and the tower bottom in the wind turbine generator according to the third embodiment of the present invention. In FIG. 7, the same reference signs have been given to constituent elements that are similar to those in FIG. 6.

As shown in FIG. 7, a three-phase AC power line (second power line) A for carrying three-phase AC power extends from a generator 70 disposed in the nacelle to a switch panel 71 via the tower, and furthermore extends outside the tower from the switch panel 71. The power line for each phase in the three-phase AC power line A is connected to a tower-side signal processing unit 60 that includes a receiver 51 and a bell 52.

Also, the nacelle-side signal processing unit 28b is connected to the AC power line 230 VAC and the DC power line 24 VDC, and is connected to the power line for each phase of the three-phase AC power line A. In this way, the nacelle-side signal processing unit 28b is configured so as to enable calling with the hub-side signal processing unit 24a via the AC power line 230 VAC and the DC power line 24 VDC, and communication with the tower-side signal processing unit 60 via the three-phase AC power line A.

Also, the nacelle-side signal processing unit 28b has a switching unit 55 for switching between the hub-side signal processing unit 24a and the tower-side signal processing unit 60, which are communication partners. A worker switches the switching unit 55 to the tower side in the case of a desire to communicate with a worker at the tower bottom, and switches the switching unit 55 to the hub side in the case of a desire to communicate with a worker in the hub. This makes it possible to perform audio communication with a worker at a desired location.

The power line used for communication between the tower-side signal processing unit 60 and the nacelle-side signal processing unit 28b can be arbitrarily determined from among the power lines for the three phases. Also, a configuration is possible in which, for example, the power line onto which information is superimposed is switched among the power lines for the three phases according to the condition of power transmission. For example, power line switching is performed if an error has occurred due to the influence of noise. Also, a configuration is possible in which the power line for one phase is used for communication, and the power line for another one or both of the other phases is used for backup.

As described above, the wind turbine generator of the present embodiment enables improving the communication environment by using electrical power as the communication medium in audio communication between the nacelle and the tower bottom, in addition to communication between the hub and the nacelle. Also, providing the tower bottom with the tower-side signal processing unit 60 and extending wiring outside the tower for the receiver 51, the bell, and the like enables performing audio communication with a worker at the tower bottom of the wind turbine.

What is claimed is:

1. A wind turbine generator in which communication can be performed between a hub and a nacelle, the wind turbine generator comprising:
    a first power line that carries electrical power between the hub and the nacelle via a slip ring;
    a hub-side signal processing unit, provided on a hub side of the slip ring, that superimposes an information signal onto electrical power carried by the first power line and extracts an information signal superimposed onto the electrical power carried by the first power line; and
    a nacelle-side signal processing unit, provided on a nacelle side of the slip ring, that superimposes an information signal onto the electrical power carried by the first power line and extracts an information signal superimposed onto the electrical power carried by the first power line, wherein there is a plurality of first power lines, including an AC power line that carries AC electrical power and a DC power line that carries DC electrical power, and the power line onto which an information signal is superimposed is switched according to a condition of power transmission, an information amount, or a type of the information signal on each of the power lines.

2. The wind turbine generator according to claim 1, wherein there are a plurality of first power lines, including an AC power line that carries AC electrical power and a DC power line that carries DC electrical power, and an information signal is superimposed one of the AC power line and the DC power line, and the other is used for backup.

3. The wind turbine generator according to claim 1, wherein the first power line between the hub-side signal processing unit and the nacelle-side signal processing unit is provided with shielding.

4. The wind turbine generator according to claim 1,
wherein the hub-side signal processing unit superimposes an information signal received as input from a hub controller via a communication line onto the electrical power carried by the first power line, extracts an information signal from the electrical power carried by the first power line, and outputs the extracted information signal to the hub controller via the communication line, and
the nacelle-side signal processing unit superimposes an information signal received as input from a nacelle controller via a communication line onto the electrical power carried by the first power line, extracts an information signal from the electrical power carried by the first power line, and outputs the extracted information signal to the nacelle controller via the communication line.

5. The wind turbine generator according to claim 4,
wherein a microphone and a speaker are connected to the hub-side signal processing unit and the nacelle-side signal processing unit, and
the hub-side signal processing unit and the nacelle-side signal processing unit superimpose an information signal received as input from the microphone onto the electrical power carried by the first power line, extract an information signal superimposed onto the electrical power carried by the first power line, and output the extracted information signal to the speaker.

6. The wind turbine generator according to claim 5, comprising:
a second power line that carries electrical power between the nacelle and a tower bottom; and
a tower-side signal processing unit that is provided in the tower and is connected to a microphone and a speaker,
wherein the nacelle-side signal processing unit has a switching unit that switches between the hub-side signal processing unit and the tower-side signal processing unit that are communication partners, and
in a case where the tower-side signal processing unit has been set as the communication partner by the switching unit, the nacelle-side signal processing unit and the tower-side signal processing unit superimpose an information signal received as input from the microphone onto the electrical power carried by the second power line, extract an information signal superimposed onto the electrical power carried by the second power line, and output the extracted information signal to the speaker.

7. The wind turbine generator according to claim 1, wherein communication of a wind turbine control signal is performed using the AC power line, and communication of a monitoring or measurement system signal is performed using the DC power line.

8. The wind turbine generator according to claim 7, wherein the wind turbine control signal includes at least one of a control signal exchanged between the hub controller and the nacelle controller and a blade strain data signal from an optical fiber sensor or the like, and the monitoring or measurement system signal includes a signal obtained by a measuring apparatus for measuring the temperature inside the hub.

* * * * *